United States Patent [19]

Gayfer

[11] Patent Number: 5,429,427
[45] Date of Patent: Jul. 4, 1995

[54] AIR BRAKE CONTROL VALVE WITH COMBINED GRADUATED AND DIRECT RELEASE

[75] Inventor: Robert Gayfer, Watertown, N.Y.

[73] Assignee: New York Air Brake, Watertown, N.Y.

[21] Appl. No.: 311,111

[22] Filed: Sep. 23, 1994

[51] Int. Cl.$^6$ .............................................. B60T 15/56
[52] U.S. Cl. ........................................ 303/36; 303/74
[58] Field of Search ..................... 303/74, 36, 28, 40, 303/37–39, 66, 57, 37, 41, 22.2, 22.3, 25–26, 72, 73, 86, 81; 188/195

[56] References Cited

U.S. PATENT DOCUMENTS

| | | |
|---|---|---|
| 4,558,907 | 12/1985 | Reiss et al. . |
| 4,775,194 | 10/1988 | Vaughn et al. ..................... 303/74 |
| 4,776,642 | 10/1988 | Hart et al. . |
| 4,783,124 | 11/1988 | Gaughan et al. . |
| 4,819,993 | 4/1989 | Gaughan et al. . |

*Primary Examiner*—Douglas C. Butler
*Attorney, Agent, or Firm*—Barnes & Thornburg

[57] ABSTRACT

A control valve is mounted to a pipe bracket which also includes a manual release valve and an emergency vent valve. The control valve operates with a single reservoir to perform service and emergency brake applications. A pair of interrelated pistons responsive to brake cylinder pressure, brake pipe pressure and control volume pressure operate a supply valve, a quick service valve end exhaust valve to maintain a fixed ratio of brake cylinder pressure to brake pipe pressure reduction. Quick service volume is continuously vented and appropriate valving is provided to allow plural sequential quick service operations. Structures provided to operate the piston stack so as to initially allow graduated brake release and subsequent direct brake release over the brake releasing range. An accelerated emergency release mechanism is also provided. The supply reservoir is only charged during the direct release mode. Brake cylinder pressure is exhausted to brake pipe following an emergency application and is exhausted to atmosphere after a service application.

35 Claims, 10 Drawing Sheets

FULL RELEASE AND CHARGING POSITION

FIG. 3

APPLICATION POSITION

FIG. 4

SERVICE LAP POSITION

FIG.5

GRADUATED SERVICE RELEASE POSITION

EMERGENCY POSITION

FIG. 8

EMERGENCY ACCELERATED RELEASE POSITION

FIG. 9

AIR BRAKE CONTROL VALVE WITH COMBINED GRADUATED AND DIRECT RELEASE

BACKGROUND AND SUMMARY OF THE INVENTION

The present invention relates generally to brake control valves for operating a vehicles air brake system in response to brake pipe pressure and more specifically to an improved control valve.

Brake control valve systems for vehicles having air brakes generally include a brake control valve responsive to brake pipe pressure in a brake pipe to operate the brakes of a vehicle from a reservoir. For reduction of brake pipe pressure, the brakes are proportionally applied. For an increase in brake pipe pressure, the brakes may be released totally, known as direct release or gradually, known as graduated release. In AAR systems, the brake control valves include a service section and emergency section connected to a pipe bracket which are responsive respectfully to a service rate of reduction and an emergency rate of reduction to apply the brakes appropriately. Each section includes a separate diaphragm responsive to brake pipe pressure on one side and a reference pressure on the other. Not only do the brake control valve differentiate between a service and an emergency application, but they also must react in a specific amount of time to apply the brakes and to propagate the signal through the brake system to other cars.

The present control valves, as exemplified by the DB-60 from New York Air Brake or the ABDW from Wabco, include service (auxiliary) and emergency reservoirs with the service section applying the fluid from the service reservoir during a service brake application and the service and emergency sections providing service and emergency reservoir pressure during an emergency brake application. The service and emergency sections propagate service and emergency signals respectively. A release valve is associated with the service section and a retainer valve is also provided. Both of these control valves are a direct release system.

Historically and in non-AAR countries, the release system is considered a graduated release. This is where the brakes can be partially released no different than the brakes being gradually applied. Systems have been designed which have the ability to convert between a graduated and a direct release. Similar systems exist wherein combination with a simpler control valve, an emergency vent valve has been provided which senses an emergency braking condition on the brake pipe and propagates the signal by locally venting the brake pipe.

For certain brake applications, there is not a need for the sophisticated braking conditions found in the DB-60 and like control valves. Also, with the increased use of electropneumatic valve systems, there is a need for a simpler redundant pneumatic valve.

Thus, it is an object of the present invention to provide a simpler control valve.

Another object of the present invention is to provide a simpler control valve to be used with electropneumatic systems.

Still a further object of the present invention is to provide a control valve which combines graduated release with direct release over the release range.

Another object of the present invention is to provide a valve which is capable of plural sequential preliminary quick service.

A further object of the present invention is to provide a control which allows for minor adjustments of brake cylinder pressure without quick service.

An even further object of the present invention is to provide a control valve which has a graduated release during the initial period and terminating with a direct release or release ensuring.

Another object of the present invention is to provide a control valve which inhibits accelerated release transmission until the valve is in its direct release mode.

These and other objects are achieved by a brake control valve system having a pipe bracket with a single section control valve thereon working with a single reservoir, an emergency vent valve thereon and a manual release valve on the control valve. The single portion valve includes a first piston subject to brake pressure on one side, quick braking valve for connecting brake pipe pressure to a quick braking volume and a supply valve for connecting the reservoir to the brake cylinder and an exhaust valve for connecting brake cylinder to atmosphere. An operator mechanism controls the quick braking and supply valves in response to the position of the first piston so as to open the quick braking valve only when the supply valve is open. The supply valve may be opened without opening the quick braking valve. This is produced by the use of poppet valves and loss motion between the elements.

A choke is provided for continuously venting the quick braking volume to the atmosphere. A limiting valve is provided for disconnecting the quick braking valve from the quick braking volume when the brake cylinder pressure is 15 greater than the brake pipe pressure. This prevents the brake pipe from being vented through the first choke in a release after an emergency braking. An in-shot valve is provided between the reservoir and the brake cylinder.

In addition to the first piston which is subject to brake pressure on one side, a second coaxial piston is provided which is responsive to brake cylinder pressure on one side for controlling, with the first piston, the supply valve and exhaust valve to maintain a fixed ratio of brake cylinder pressure to brake pipe pressure reduction. Appropriate loss motion is provided between the first and second pistons as well as the second piston and the supply and quick braking valves. This allows supplying of the brake cylinder with the reservoir pressure by opening supply valve without opening the quick braking valve to maintain a given value in the brake cylinder.

An exhaust valve is provided for connecting the brake cylinder to atmosphere when opened by the first piston in response to an increase in brake pipe pressure which indicates a release. A control volume is provided preferably in the pipe bracket and the first piston is subject to control volume on a second side opposite the first side which has the brake pipe pressure. A charging valve connects the brake pipe to the reservoir and to the control volume when open. This valve permits charging of the reservoir and the control volume. The charging valve also controls the first piston to operate the exhaust valve in a graduated release mode for initial ranges of increased brake pipe pressure and the charging valves open for a full release of the brakes for a final range of increased brake pipe pressure in a direct release made. The opening of the charging valve interconnects both sides of the first piston to ensure that it goes into the fully released mode and also provides an increase in brake pipe pressure from the supply reservoir and the control volume to increase the propagation of the direct release down the brake pipe.

An emergency relay valve connects the reservoir to the supply valve when the brake cylinder pressure is below a first value compared to the control volume pressure.

An emergency accelerator release mechanism is also provided. It includes a dissipation valve which connects brake pipe and the brake cylinder when the brake cylinder pressure is a first value greater than the brake pipe pressure. An accelerator release valve connects the dissipation valve to the brake pipe and is opened when the brake pipe pressure is above a minimum value. Upon release or recharging after an emergency application, first the accelerator release valve is opened, providing brake pipe on one side of the dissipation valve. Since the brake cylinder has a greater pressure than the brake pipe, the dissipation valve is opened and brake cylinder is bled into the brake pipe and thereby increases the pressure in the brake pipe. This propagates the brake pipe release signal. It should be noted that the brake cylinder exhaust valve has not opened yet. As the brake pipe pressure builds up, the brake cylinder exhaust valve opens after the dissipation valve closes. This exhausts the remainder of brake cylinder pressure to atmosphere instead of the brake pipe.

With respect to the overall system, the control volume and the quick braking volume are preferably in the pipe bracket. The control valve includes the first and second pistons, supply valve, quick braking valve, brake cylinder exhaust valve, dissipation valve, emergency accelerated release valve, emergency relay valve and in-shot valve. The emergency vent valve on the pipe bracket is responsive to the emergency rate of decrease of pressure, to vent the brake pipe at the pipe bracket to atmosphere to initiate and propagate emergency braking. The emergency vent valve does not provide any direct control of the brake cylinder. This is performed by the control valve. A manual release valve is mounted to the control valve for venting both the cylinder and the reservoir when manually actuated. The release valve completely vents the brake cylinder in response to manual actuation and vents the reservoir only during manual actuation.

Other objects, advantages and novel features of the present invention will become apparent from the following detailed description of the invention when considered in conjunction with the accompanying drawings.

DETAILED DESCRIPTION OF PREFERRED EMBODIMENTS

Figure 1:
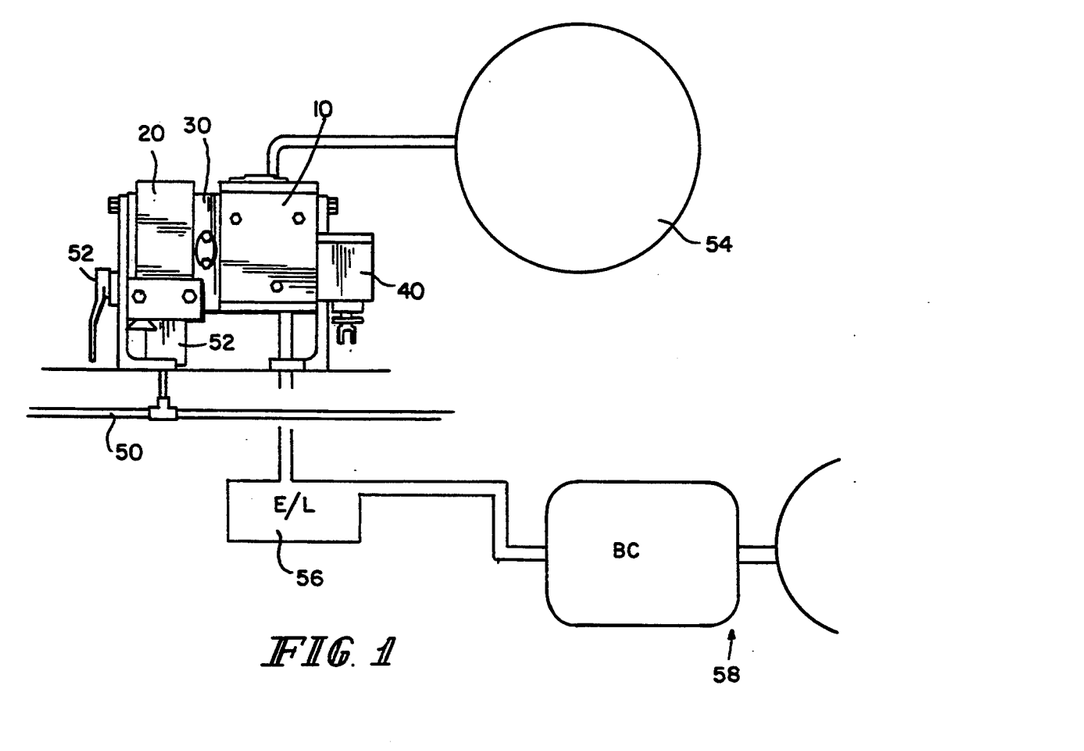
FIG. 1 is a block diagram of a vehicle brake system incorporating the principles of the present invention.

A vehicle braking system is shown in FIG. 1 as including a control valve portion 10 connected to a pipe bracket 30. An emergency vent valve 20 is also mounted to the pipe bracket 30. A manual release valve 40, for example in a DB-60, is connected to the control valve piston 10. Brake pipe 50 is connected to the pipe bracket 30 through a dirt collector and cut-out cock 52. A single supply reservoir, (SR)54 is connected to the pipe bracket 30 as is the brake cylinder (BC) or truck mounted brake 58 through an empty load valve (E/L)56. When not needed, the empty load valve 56 can be deleted. The control valve 10 performs charging, service and emergency applications and release functions as well as quick service braking and accelerated release in emergency. The emergency vent valve 20 provides only emergency initiation and propagation and no braking functions. Thus, it senses an emergency application and connects the brake pipe through the pipe bracket 30 to atmosphere to quickly draw down the brake pipe 50. The release valve 40 provides manual release of the brake cylinder and exhausts the supply reservoir when manually actuated. A single supply reservoir 54 may be, for example, an 8000 cubic inch reservoir and the only reservoir connected to the pipe bracket 30.

It should be noted that the control valve 10, emergency vent valve 20 and the release valve 40 are shown connected on a single side of a pipe bracket 30, this is but one embodiment. This single sided mounting is preferable for specific car construction. The principles of the present invention include the unique control valve 10 mounted to any style pipe bracket with the emergency vent valve on the other side. Preferably, the control volume and the quick service volume are located in the pipe bracket 30. This reduces the weight and overall size of the control valve portion 10.

After describing the specific elements of the valve, the operation of various elements will be described.

Figure 2:
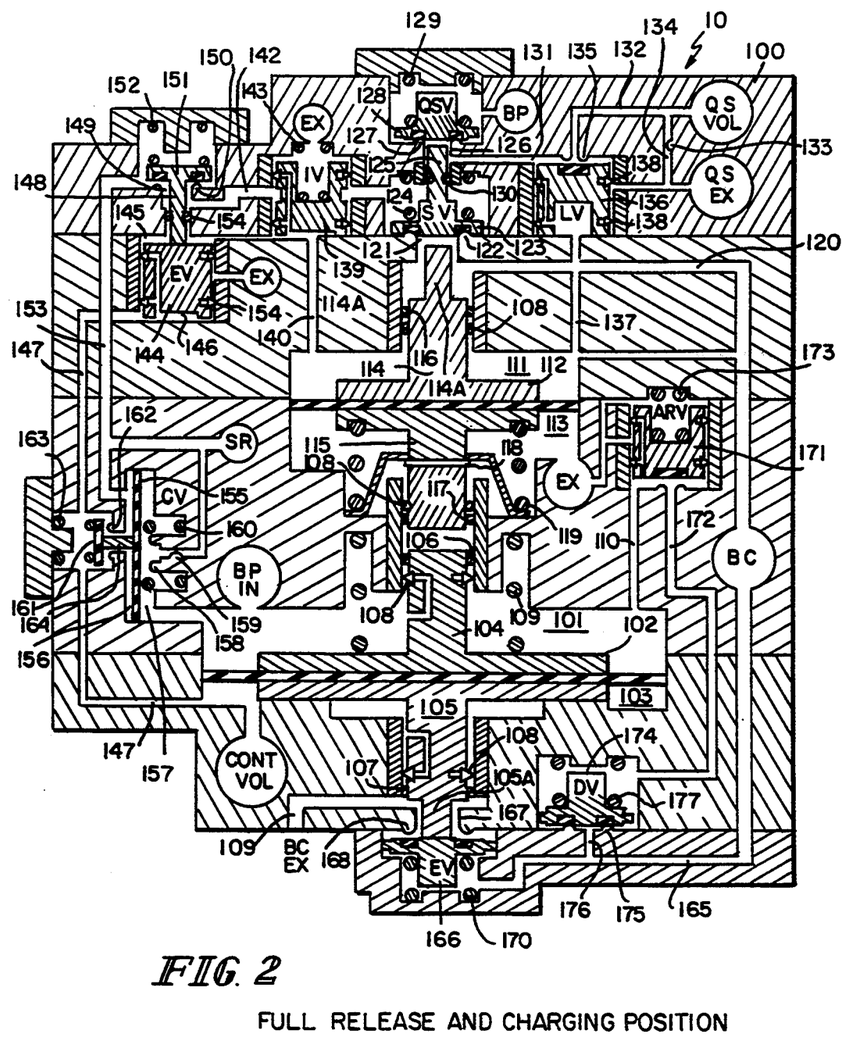
FIG. 2 is a cross-section of a control valve incorporating the principles of the present invention into a release and charging position.

The valve in its released and charging position is illustrated in FIG. 2. A main or a control piston. 102 lies in a chamber having brake pipe pressure in an upper chamber 101 and control volume pressure in lower chamber 103. A pair of operators 104 and 105 extend from the control piston 102 and are received in guides 106 and 107 respectfully. Seal 108, for example, pressurized K-rings, seals the chambers 101 and 103 and allows the operators 104 and 105 to sealably slide relative to the housing 100. An extension 105A of operator 105 controls the brake cylinder exhaust valve 166. Passage 110 connects the brake pipe at port BP IN to chamber 101 above the control piston 102. A control piston return spring 109 biases the control piston 102 down. The spring 109 may be, for example, a one-pound spring.

A relay piston 112 is subject to brake cylinder pressure in an upper chamber 111 and atmosphere in lower chamber 113. A pair of operators 114 and 115 extend from the relay piston 112 and are received in slides 116 and 117 respectively. Seals 108, for example, O-rings, are provided for the operators 114 and 115. A gap or loss motion is provided between the upper operator 104 of the control piston 102 and the lower operator 115 of the relay piston 112. The brake cylinder port BC is connected to the upper chamber 111 of the relay piston 112 through passage 120 and along the outside of the upper operator 114. A release bias spring 119, for example 5 lbs., with cage is slidably carried by operator 115 and cage stop 118. The release spring 119 has no affect on the supply valve 123 and only comes into use when compressed during a release, illustrated in FIG. 5, to bias the piston stack 102, 112 up.

An extension 114A of operator 114 of the relay piston 112 lies in a bore 121 which terminates with a supply valve seat 122. The supply valve 123 rests on the supply valve seat 122 and controls the communication of the service reservoir SR to the brake cylinder BC through bore 121 and passage 120. The separation from the upper operator extension 114A and the bore 121 defines a supply choke or restriction which may be for example equivalent to a 0.125 inch diameter bore. The supply valve 123 is bias closed by a spring 124 having a valve for example of half of a pound.

The piston stack 102, 112 compares brake pipe and brake cylinder pressure in the top chambers 101 and 111 respectively, to the control volume pressure in chamber 103 and operates the brake cylinder supply valve 123 and the brake cylinder exhaust valve 166 to control the pressure in the brake cylinder at a fixed ratio to a decrease in pressure in the brake pipe. For example, to reach a 2.5:1 ratio of brake cylinder pressure to brake pipe pressure reduction, the area of the piston diaphragm 102 can be, for example, 12 square inches and the area of piston/diaphragm 112 could be 4.8 square inches. Thus, for each pound of decrease of brake pipe pressure in chamber 102, the brake cylinder pressure would have to increase by 2½ pounds in order to bring the stack into equilibrium or lap. Any variation from this ratio will cause either the supply valve 123 to open to provide greater pressure to the brake cylinder, or the exhaust valve 166 to remove pressure from the brake cylinder.

In previous brake control or triple valves, the brake pipe pressure was compared to the supply reservoir, auxiliary reservoir or control reservoir which was supplying the brake cylinder. When these two pressures matched, the brake cylinder pressure was fixed. Since the brake cylinder volume is small compared to these reservoir's volume, changes in the brake cylinder volume were not taken into account. In use, the wheels, brake shoes and other elements between the brake cylinder and the wheel wear. This wear will result in a change of the volume of the brake cylinder. The equalization system of the prior control valves would not accommodate for this increase in volume of the brake cylinder. Thus, the brake cylinder pressure or desired braking cannot be assured. The present system using a relay system compares the brake cylinder pressure to the brake pipe pressure to provide a fixed ratio of decrease of brake pipe pressure to brake cylinder pressure. Thus, the relay system would accommodate for any change in the volume of the brake cylinder due to wear of the elements.

An operator 125 extends from the supply valve 123 and rides in bore 126 which terminates in a valve seat 127. A quick braking or quick service valve 128 mates with the valve seat 127 to connect the brake pipe port BP to bore 126 when opened. A spring 129, for example half of a pound, biases the quick services valve closed.

A seal, for example O-ring allows the operator 125 to sealably slide within the bore 126 and isolate the chamber in which the supply valve 123 operates from the chamber in which the quick service valve 128 operates. Bore 126 is connected to the quick braking or quick service volume QS VOL via passages 131 and 132. A restriction 133 in passage 134 connects the quick service volume and passage 132 to exhaust through a quick service exhaust port QS EX. The annular space between the service valve operator 125 and bore 126 defines the quickest service choke and may be, for example, equivalent to a 0.062 inch diameter bore.

It should be noted that there is a lost motion between the operator end 114A of the relay piston 112 and the supply valve 123 and lost motion between the operator 125 of the supply valve 123 and the quick service valve 128. The lost motion between the supply valve 123 and the quick service valve 128 allows the supply valve to be opened independent of the quick service valve to maintain a desired pressure in the brake cylinder without actuating quick service. Also, it should be noted that the quick service volume QS VOL is continuously connected to the atmosphere through continuous quick service choke 133. Thus the quick service volume is capable of quick service operation for plural sequential brake applications.

A quick service limiting valve 136 interacts with valve seat 135 on passage 132 to close off the connection of the brake pipe to the quick service volume QS VOL and the exhaust QS EX when the quick service valve 128 is opened. The limiting valve 136 has brake pipe pressure on the top and brake cylinder pressure via passage 137, chamber 111 and passage 120. Seals 138, for example, pressurized K-rings, are provided for the limiting valve 126. When the quick service valve 128 is opened, the brake pipe pressure is generally higher than the brake cylinder pressure and the limiting valve 136 is opened. In emergency application and recharging after an emergency application, the brake pipe pressure is less than the brake pipe pressure, thus the limiting valve 136 is closed. The limiting valve 136 remains closed until the brake pipe pressure is higher than that of brake cylinder. This prevents the brake pipe from being bleed down to exhaust through choke 133 after emergency application until the brake pipe has reached a desired level.

An in-shot 139, having atmosphere in a chamber above it and brake cylinder pressure in a chamber below it supplied via passage 140 to chamber 111, forms a variable restriction between passages 141 and 142 connected to the supply valve 123. An in-shot spring 143 for example 5 pounds, biases the in-shot 139 to its unrestricted free flow position. The spring is calibrated so as to provide unrestricted flow until the brake cylinder pressure exceeds approximately 15 PSI. When the brake pressure exceeds the bias of spring 143, the in-shot 139 will move up to further restrict the flow to the brake cylinder through the supply valve 123. The restriction varies from the equivalent of a 0,125 inch diameter bore to a 0,062 inch diameter bore.

An emergency relay piston 144 is responsive to brake cylinder pressure in an upper chamber 145 and control volume pressure in a lower chamber 146 via passage 147. An operator 148 engages the emergency relay piston 144 and lies in bore 147 which has a valve seat 150 at the end thereof. An emergency relay valve 151 is normally biased closed against the valve seat 150 by spring 152. Passage 153 connects the supply reservoir SR to the valve seat 150. Seals 154, for example K-rings and O-rings, isolate bore 149, chamber 145 and chamber 146 from each other. The emergency relay piston 144 compares brake cylinder pressure to control volume pressure and attempts to maintain it at a fixed ratio. For example, the ratio may be that the brake cylinders is 85% of the control volume pressure. As shown, the ratio is determined by spring 152, but can also be determined by the ratio of the top and bottom surface of the emergency relay piston 144 alone or in combination with spring 152. Once the brake cylinders is 85% of the control volume, the emergency relay valve 151 is closed cutting off the supply reservoir from its serial connection through the supply valve 123 to the brake cylinder BC.

Figure 6:
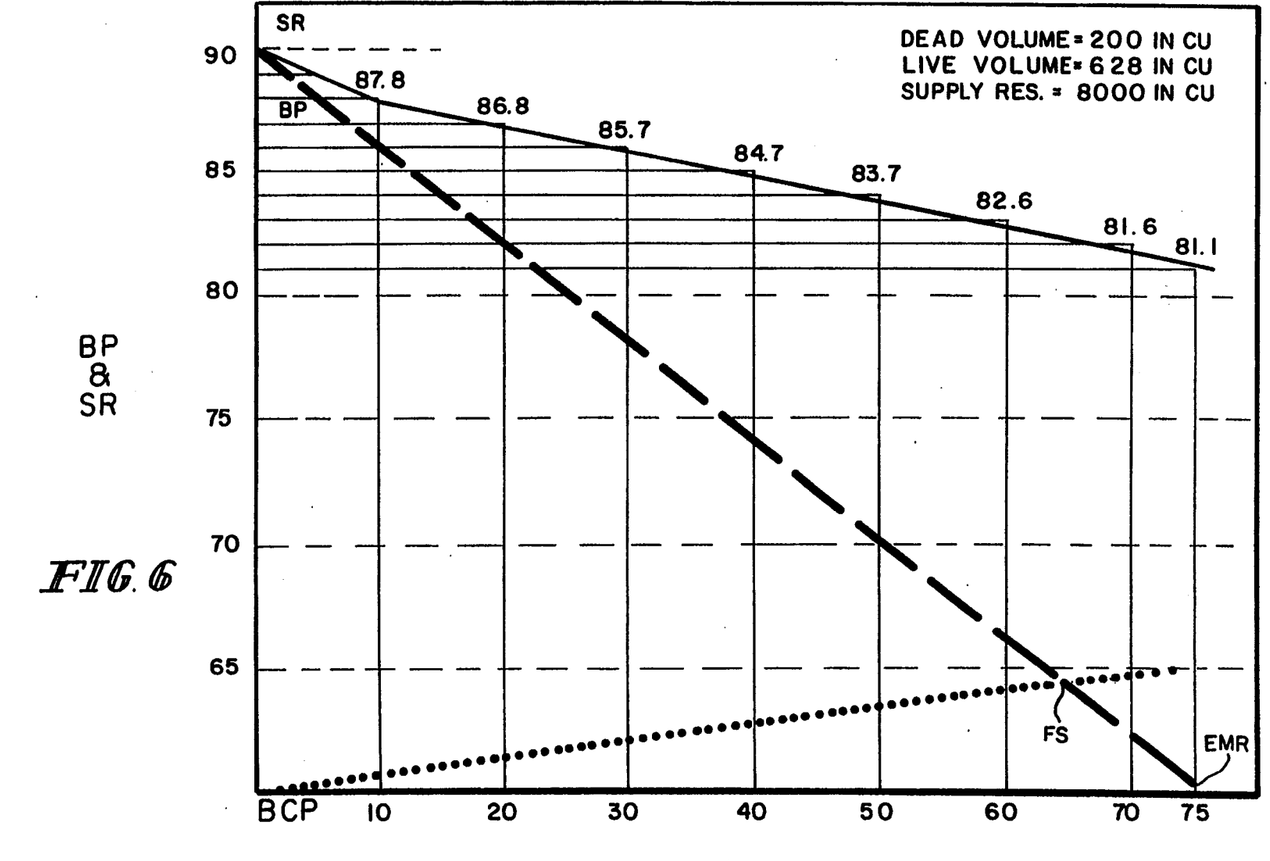
FIG. 6 is a graph of brake pipe and supply reservoir pressure versus brake cylinder pressure.

Since the present system is a relay system for controlling the supply valve 123 and the pressure in the brake cylinder, the emergency relay piston 144 and emergency relay valve 151 permit the present system to meet the Power Brake Law requirement that brake cylinder pressure be 15-20% higher than service brake cylinder pressure. Referring to FIG. 6, the brake pipe and supply reservoir are initially charged to 90 psi. A full service brake cylinder pressure is 65 psi. Thus, to satisfy the Power Brake Law for the emergency brake cylinder pressure, the cylinder brake pressure must be between 74.5 and 78 psi. The chart indicates that the emergency brake cylinder pressure is 75 psi. Using the ratio 85% of the control reservoir, 90 psi yields a pressure of 76.5 psi which is between the 74.5 and 78 psi Power Brake Law requirements. Thus, the emergency relay valve 151 is open for service application and only closes in an emergency situation when the brake cylinder is 85% of the supply reservoir. By using an emergency relay piston and valve, the brake cylinder can be resupplied in an emergency application when the brake cylinder pressure leaks down. The emergency piston 144 and the emergency valve 151 are not capable of bailing off the increase of brake cylinder pressure.

A charging valve 155 has supply reservoir pressure in chamber 156 on the left side and brake pipe pressure in chamber 157 on its right side. A valve seat 158 is connected to passage 153 through charging and stability choke 159. The choke 159 may have a diameter of 0.050 inches, for example. Pressure spring 160 biases the charging valve 155 open when the brake pipe is within or greater than 0.5 psi of the supply reservoir pressure. A control volume check valve 161 is operatively connected to the charging valve 155 and interconnects the supply reservoir passage 153 to the control volume passage 147 through valve seat 162. The clearance between operator 164 and the bore of valve seat 162 defines a control volume charging choke and may be, for example, equivalent to a 0.020 inch diameter bore. A check valve spring 163 biases the check valve 161 closed.

It should be noted that opening of the charging valve 155 and the control volume check valve 161 connects the supply reservoir and the control volume to brake pipe via the brake pipe chamber 101 of the control piston 102. This allows charging of the supply reservoir and control volume from the brake pipe when the brake pipe pressure is greater than the supply reservoir pressure, and charging the brake pipe to accelerate release from the supply reservoir when the supply reservoir pressure is slightly greater than the brake pipe pressure. Similarly, these open valves interconnect the top chamber 101 and the bottom chamber 103 of the control piston 102. This is important during the release ensuring portion of the release range to convert from a graduated release to a full release function or mode.

The brake cylinder port is connected via passage 165 to an exhaust valve 166. A bore 167 having the exhaust seat 168 thereon interconnects passage 165 and exhaust passage 169 to atmosphere. A spring 170, for example a half of a pound, biases the exhaust valve 166 closed. The extension 105A of operator 105 lies in bore 167 and defines therewith the brake cylinder exhaust choke. The clearance may be for example, equivalent to a 0.094 inch diameter bore. When the brake cylinder exhaust valve, 160 is opened, it exhausts the brake cylinder and thereby releases the brakes. There is lost motion between the operator 105 of the control piston 102 and the exhaust valve 166.

An accelerated release valve 171 interconnects the brake pipe port BP IN and its passage 110 to passage 172. Spring 173 for example 2.5 pounds, biases the accelerated release valve 171 closed. A dissipation valve 174 connects passage 172 to passage 165 through passage 176 when it is open or off valve seat 175. Spring 177, for example one pound biases, the dissipation valve 174 closed. When the accelerator release valve 171 is opened for a given value of brake pipe pressure, the dissipation valve 174 has brake pipe pressure on the top and brake cylinder pressure on the bottom. When the brake cylinder pressure exceeds the brake pipe pressure by a given value, the dissipation valve 174 will open increasing the pressure in the brake pipe using the brake cylinder pressure. This operation provides an acceleration of the release after an emergency application, since it is the only anticipated condition where the brake cylinder pressure would exceed the brake pipe pressure.

RELEASE AND CHARGING

The control valve 10 in its release and charging position is illustrated in FIG. 2. Since there is no pressure in the control volume or the brake pipe, chambers 101 and 103 are at atmosphere and the control piston 102 is held in a lowered position by spring 109. This opens the exhaust valve 166 which connects the brake cylinder to exhaust. Control piston 102 in its lowered position is also displaced from relay piston 112. The spring 119 and its cage rests on stop 118 and the spring is not compressed. Since supply valve 123 is closed, the quick service valve 128 is also closed by spring 129. The inshot 138 is in its unrestricted flow position by spring 143 and the emergency relay valve 151 is closed by spring 152. As long as the brake pipe and the supply reservoir are both at atmosphere, the charging valve 155 and the control volume check 161 are opened by spring 160. Emergency accelerated release valve 171 is closed by spring 173 as is dissipation valve 174 by spring 177.

As the brake pipe charges, the control valve 10 is charged through open charging choke 159 to fill the supply reservoir and the control volume. Once the brake pipe pressure exceeds for example 10 PSI, accelerator release valve 171 opens providing a brake pipe pressure in passage 172 to the dissipation valve 174. Since the brake cylinder has no pressure, the dissipation valve 174 is closed. The supply reservoir is charged through supply reservoir charging stability choke 159 and the control volume is charged through control volume choke about operator 164. The charging valve spring 160 provides an open bias of nominally a half of a PSI. The charging choke 159 prevents unintended applications of brakes. Once the system is fully charged, the elements remained in the position shown in FIG. 2.

Since the charging valve 155 and the control volume check valve 161 are opened, both chambers 101 and 103 of the control diaphragm 102 are interconnected and therefore the spring 109 keeps the control diaphragm the piston 102 in its lower position.

SERVICE APPLICATION

Figure 3:
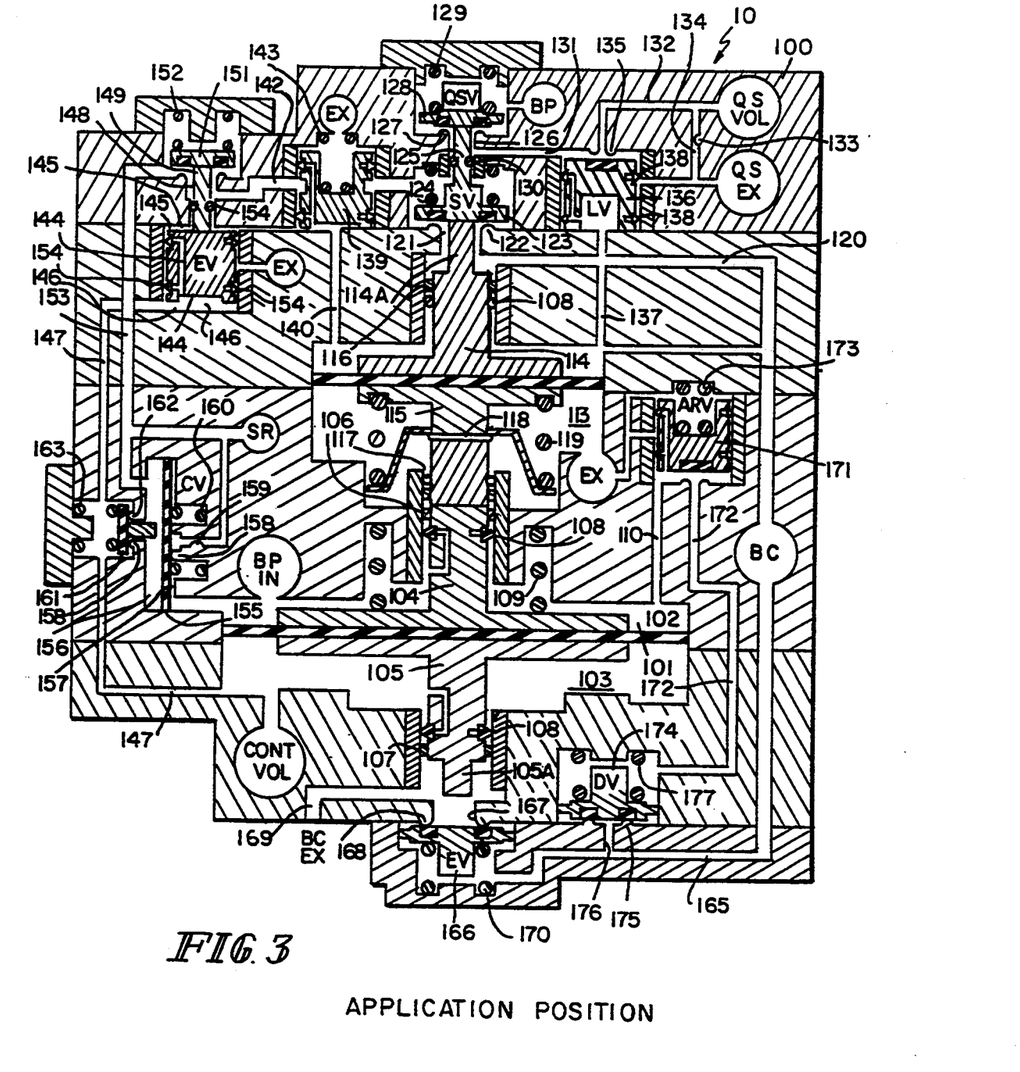
FIG. 3 is a control valve of FIG. 2 in its application position.

In a fully charged system, brake pipe reduction must exceed the capacity of the charging valve stability choke 159 to create a sufficient differential (nominally about half PSI) between the supply reservoir SR and the brake pipe BP. The charging stability choke 159 provides stability against unintended application due to minor variation in brake pipe pressure. Reference is made to FIG. 3. When a sustained reduction of brake pipe pressure exceeds 1 PSI per 1.8 seconds, the charging valve 155 closes against seat 158 disconnecting the brake pipe from the control volume and the supply reservoir. Further reduction of the brake pipe will cause the higher pressure in the control volume in chamber 103 below control piston 102 to move the control piston 102 upward engaging the relay piston 112 and closing brake cylinder exhaust valve 166 on seat 168. This allows the brake cylinder to be charged from the supply reservoir. At nominally ⅔'s PSI differential and further upward movement of control piston 102, the relay piston 112 will first open the supply valve 123 and then the quick service valve 128. The open quick service valve 128 will locally and quickly decrease brake pipe for example one-to-one and one-half PSI through the quick service choke formed between operator 125 and bore 126 into the quick service volume via passages 131 and 132. This provides accelerated service application.

During initial application, the relay piston 112 must overcome the force of the supply reservoir pressure on top of the supply valve 123. As it does, the relay piston 112 jumps through the sudden equalization of pressure above and below the supply valve 123. This initial jump, allows the supply valve operator 125 to unseat the quick service valve 128 against the brake pipe pressure and the spring 129 to unseat the quick service valve 128. Once the quick service valve 128 opens, a sudden reduction of the brake pipe occurs locally as pressure flows into the quick service volume keeping the quick service valve 128 open. While the quick service 128 is open, continuous quick service or accelerated application occurs from the quick service volume through the continuous quick service choke 133 to exhaust. Once the quick service valve is closed, the quick service volume continues to bleed down through the continuous quick service choke 133. Should a subsequent application occur, additional quick service or accelerated application would occur because the quick service volume is continuously exhausted.

While the brake cylinder pressuring is increasing to a final ratio defined by the surface of piston 112 and that of piston 102, brake pipe pressure will continue to exhaust through the continuous quick service choke 133. Once the ratio is met, the quick service valve 128 closes concluding the accelerated application and subsequently the supply valve 123 will close. When the brake cylinder is nominally 15 PSI, the in-shot valve 139 will move up choking further flow of supply reservoir to a service rate. The emergency relay valve 151 stays open during service application. Similarly, the increase brake cylinder pressure under limiting valve 136 will cause it to move up and disconnect the quick service valve 128 and passage 131 from the quick service volume QS VOL and the quick service exhaust. Subsequent actuation of the quick service valve 128 will require the brake pipe first to move the limiting valve 136 down in order to perform a quick service or accelerated application.

SERVICE LAP

Figure 4:
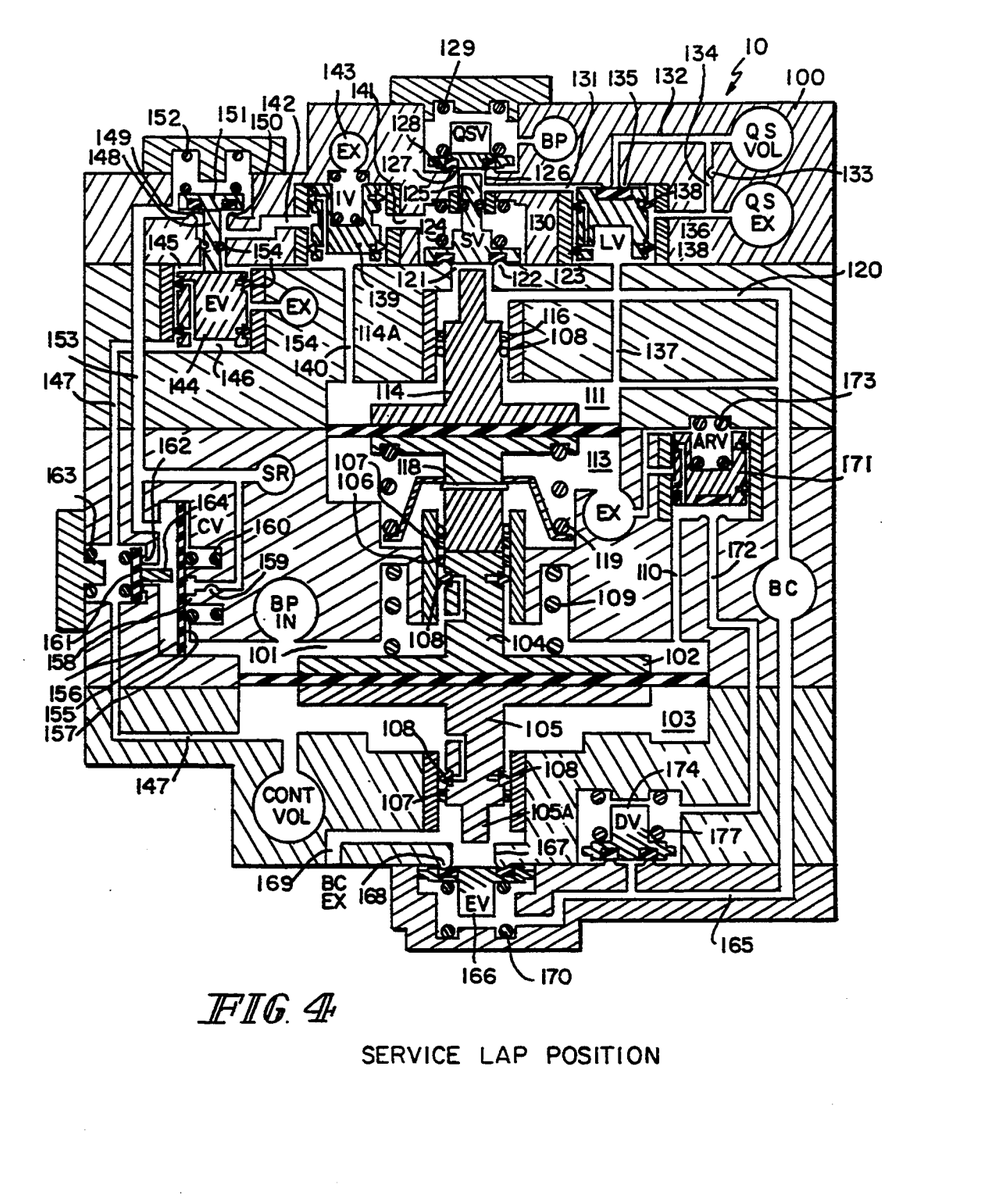
FIG. 4 is a cross-sectional view of the valve in FIG. 2 in its service lap position.

The position of the elements once the desire to brake cylinder to brake pipe ratio is established is considered the service lap position as illustrated in FIG. 4. Variations in brake cylinder pressure caused by seeping up or leaking down is automatically corrected by the relay piston 112 and control piston 102 stack to maintain the correct ratio between brake cylinder and brake pipe. The piston stack 102, 112 assures a fixed rate of 2.5:1 of brake cylinder pressure to brake pipe pressure reduction independent of the volume or change of volume of the brake cylinder. The initial upward movement of the relay piston 112 and control piston 102, for small variations, are capable of opening the supply valve 123 by itself and without actuating the quick service valve 128. This stability is an improvement over prior type equipment that could not bail off excessive brake or resupply the brake cylinder until the limiting valve kick-ins at normally 10 PSI and then could only maintain this lower level of braking.

SERVICE RELEASE

Figure 5:
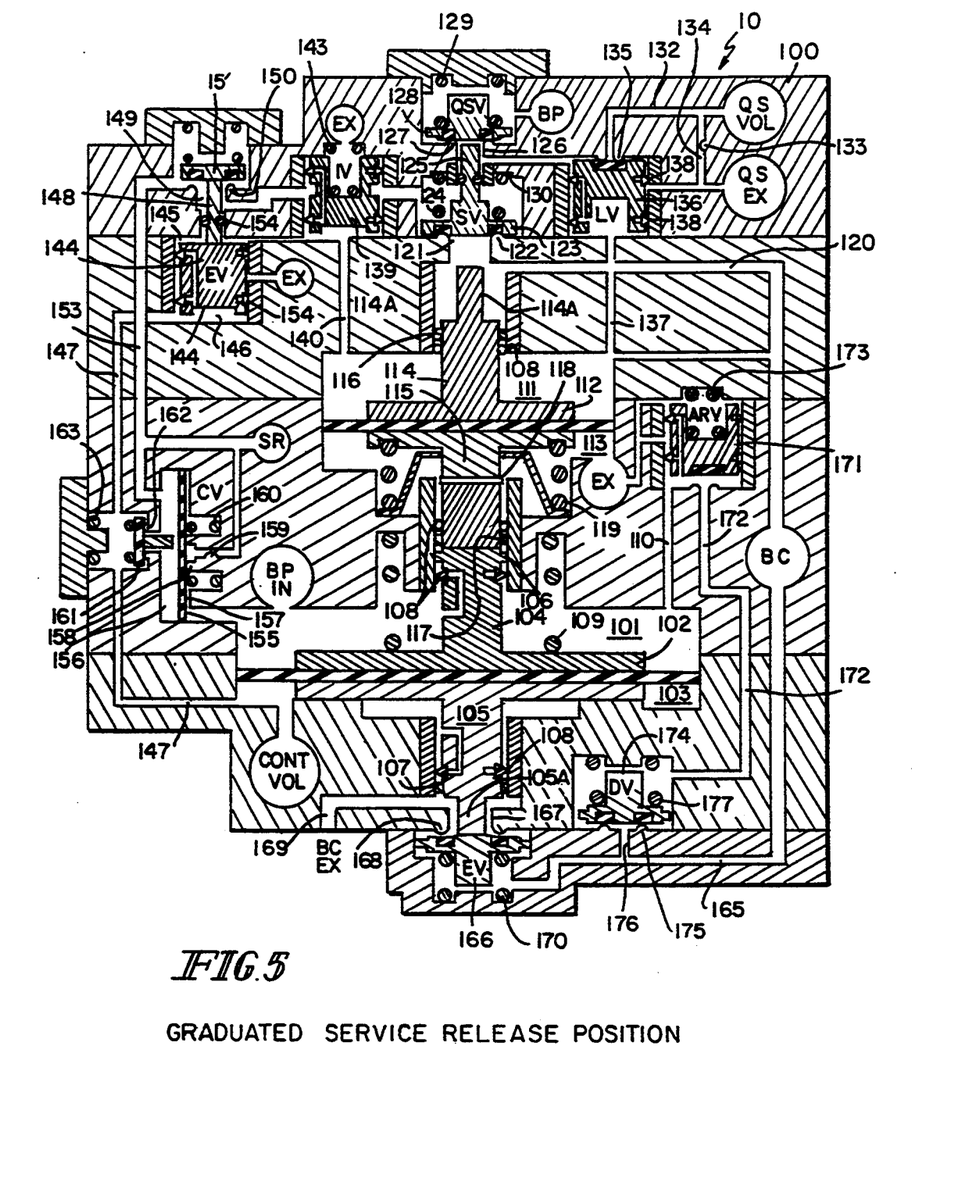
FIG. 5 is a cross-sectional view of the valve in FIG. 2 in its graduated service release position.

For a service release, the brake pipe pressure increases and the balance changes between the total forces upward and downward on the piston stack 102, 112. As the downward forces increase, the brake pipe pressure increase in chamber 101, the piston stack will first overcome the upward bias of the relay spring 119 and the upward force of the brake cylinder under the exhaust valve 166. Once the cage of spring 119 bottoms out, downward movement lifts the cage off stop 118 and compresses spring 119. When brake pipe is normally ⅔'s PSI higher than the equilibrium force, the control piston operator 105 will open the brake cylinder exhaust valve 166 as illustrated in FIG. 5. Brake cylinder pressure will exhaust through the annular choke area between the extension 105A of the operator 105 and bore 167, offsetting the increase downward force of the brake pipe. When release is terminated and equilibrium is achieved between the brake cylinder pressure and brake pipe pressure according to the predetermined ratio, the exhaust valve 166 will close. This is a graduated release mode of operation.

Graduated release can be made in any increment from full service (normally 26 PSI BP reduction), until brake pipe is normally 10 PSI lower than the initial brake pipe charge. When the brake pipe pressure is normally 6 PSI lower than the initial brake pipe pressure, the system will go into a direct or full release through a release ensuring feature. This eliminates stuck brakes associated with equalizing systems of the prior art. During graduated release, the piston stack 102, 112 and the exhaust valve 166 cycle between the service lap position of FIG. 4 and the graduated service release position of FIG. 5. All the other valves in the system maintain their service lap position.

A direct release occurs when the brake pipe is nominally one half of PSI lower than the actual supply reservoir value as determined by opening bias of the charging valve 155. Once the charging valve 155 opens when the recharge brake pipe is within one half of a PSI of the actual supply reservoir value, the control volume check 161 is also open interconnecting the brake pipe and the control volume. This causes chamber 101 above the control piston 102 and chamber 103 below the piston 102 to be equalized. This removes a major upward force from chamber 103 and causes the piston stack 102, 112 to assume a direct or full release position as illustrated in FIG. 2. Exhaust valve 116 remains open and the brake cylinder is completely vented to atmosphere. With the decrease in brake cylinder pressure, first the in-shot 139 moves to its unrestricted position and subsequently the limiting valve 136 opening. Emergency relay valve 151 remains open during service release. Spring 119 moves the relay piston 112 to its fully release and charging position separating operator 115 of the relay piston 112 and operator 104 of the control piston 102 as illustrated in FIG. 2.

The range of graduated release and value of brake pipe at which direct release or release ensuring occurs will depend upon the amount of service brake application. As illustrated in FIG. 6, the supply reservoir pressure diminishes as a function of the amount of braking for a system fully charged at 90 psi brake pipe pressure. Brake cylinder pressure at full service is 65 PSI and brake cylinder pressure emergency is 75 PSI. For example, for minimum brake pipe reduction application of 6 PSI, the brake cylinder pressure is 15 PSI and supply reservoir would be 87.3 PSI. Thus, direct release would occur at a brake pipe pressure of 86.8 PSI (87.3−0.5) and the graduated release range would be 2.8 (86.8−84). For a full service brake pipe reduction of 26 PSI, (BP=64 PSI) the brake cylinder pressure would be 65 PSI and the supply reservoir pressure is 82.1. Thus, the brake ensuring or direct release will occur at a brake pipe pressure of 81.6. Thus, the brake pipe would have a value in the range of 64 PSI and the graduate release range would be 17.6 PSI.

It should be noted that since the brake pipe is not connected to the supply reservoir until it is within a half PSI of the supply reservoir, the brake pipe is a pure control pipe in graduated release. The opening of the charging valve 155 connects the brake pipe and the supply reservoir allowing a half of PSI of air from the supply reservoir to charge the brake pipe thereby accelerating the propagation of the release signal down the brake pipe. Similarly, this limits the recharging of the supply reservoir from the brake pipe until the last 4–8 PSI of brake pipe charging to its original value. Thus release from a minimum application would be much faster than prior art devices due to the delayed recharge of the supply reservoir and the release ensuring feature.

EMERGENCY APPLICATION

Figure 7:
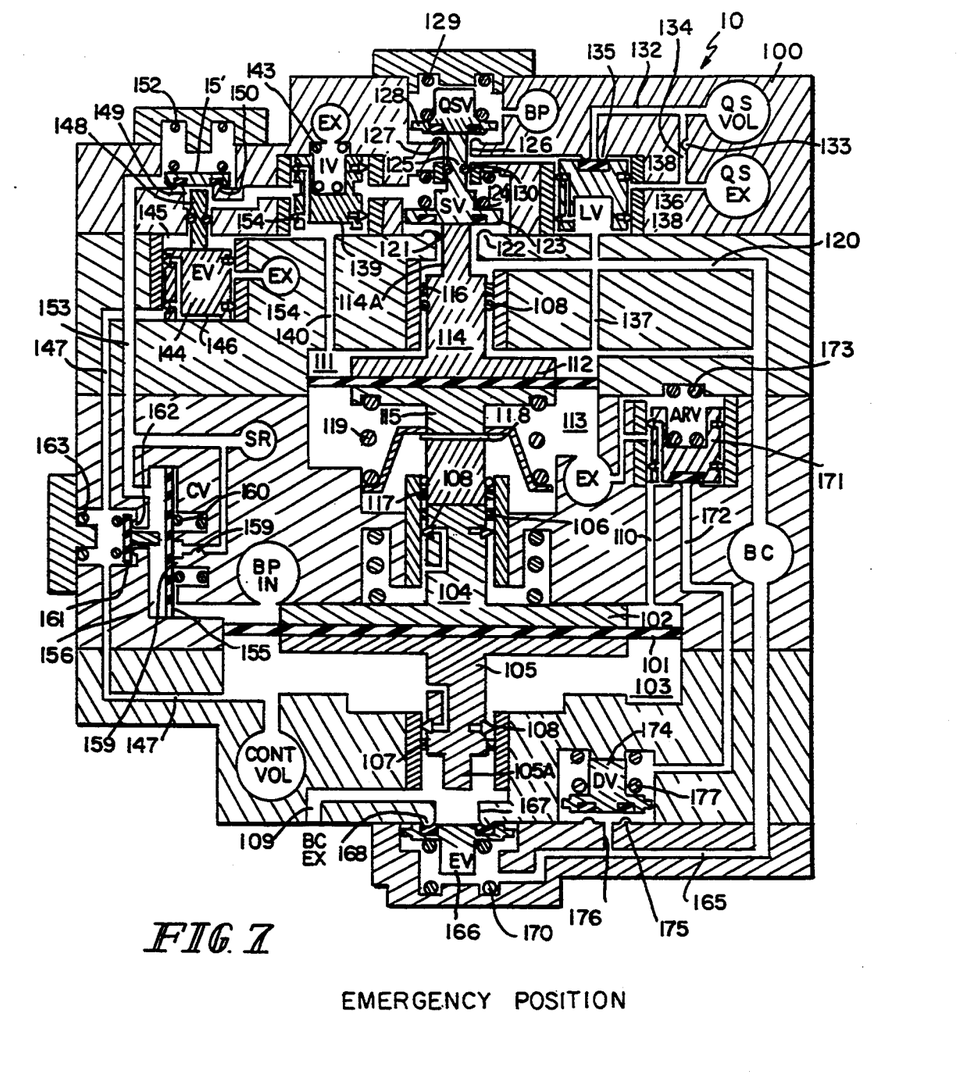
FIG. 7 is a cross-sectional view of the valve in FIG. 2 in its emergency position.

For an emergency rate of decrease of brake pipe pressure, the control valve 10 will move from its full release and charging position of FIG. 2 to the emergency position of FIG. 7. Initially, the charging valve 155 closes and the control and relay pistons stack 102, 112 will move rapidly upward by the force of the pressure in the control volume. As in a service application, the exhaust value 166 closes and the supply valve 123 and the quick service valve 128 immediately open and remain open until the emergency application is released. The control valve 10 does not assume a lap position of FIG. 4. Once the brake cylinder pressure exceeds that of the brake pipe pressure, limiting valve 136 closes. The in-shot 139 will move up at nominally 15 PSI brake cylinder pressure and will control the rate of the final brake cylinder pressure to allow full emergency brake cylinder pressure in 12–14 seconds.

Since the supply valve 123 remains open after an emergency application and until released, the emergency relay valve 151 closes when the brake cylinder pressure is nominally 85% of the control volume pressure. Any leakage of the brake cylinder pressure is compensated by the emergency relay valve 151 opening to reconnect the supply reservoir to the brake cylinder through the open supply valve 123. Once the brake pipe pressure is decreased below 10 PSI, the accelerated release valve 171 closes cutting off the brake pipe from the dissipation valve 174 and passage 172 above dissipation valve 174. When the brake cylinder pressure unseats the dissipation valve 174, this brake cylinder pressure fills the passage 172 between the dissipation valve 174 and the accelerated release valve 171. Spring 177 closes the dissipation valve 174 trapping the brake cylinder pressure in passage 172.

Since the exhaust valve 166 and the dissipation valve 174 are closed during emergency, only the emergency relay valve 151 can open to resupply the brake cylinder when the brake cylinder pressure decreases. Any increase of brake cylinder pressure above the valve defined by the emergency relay piston, cannot be bailed off by the closed exhaust valve 160 since the piston stack 102, 112 is inoperable. This is a safety feature to prevent a malfunctioning cylinder from bailing off the entire supply reservoir when the car is parked for extended periods.

EMERGENCY RELEASE

Figure 8:
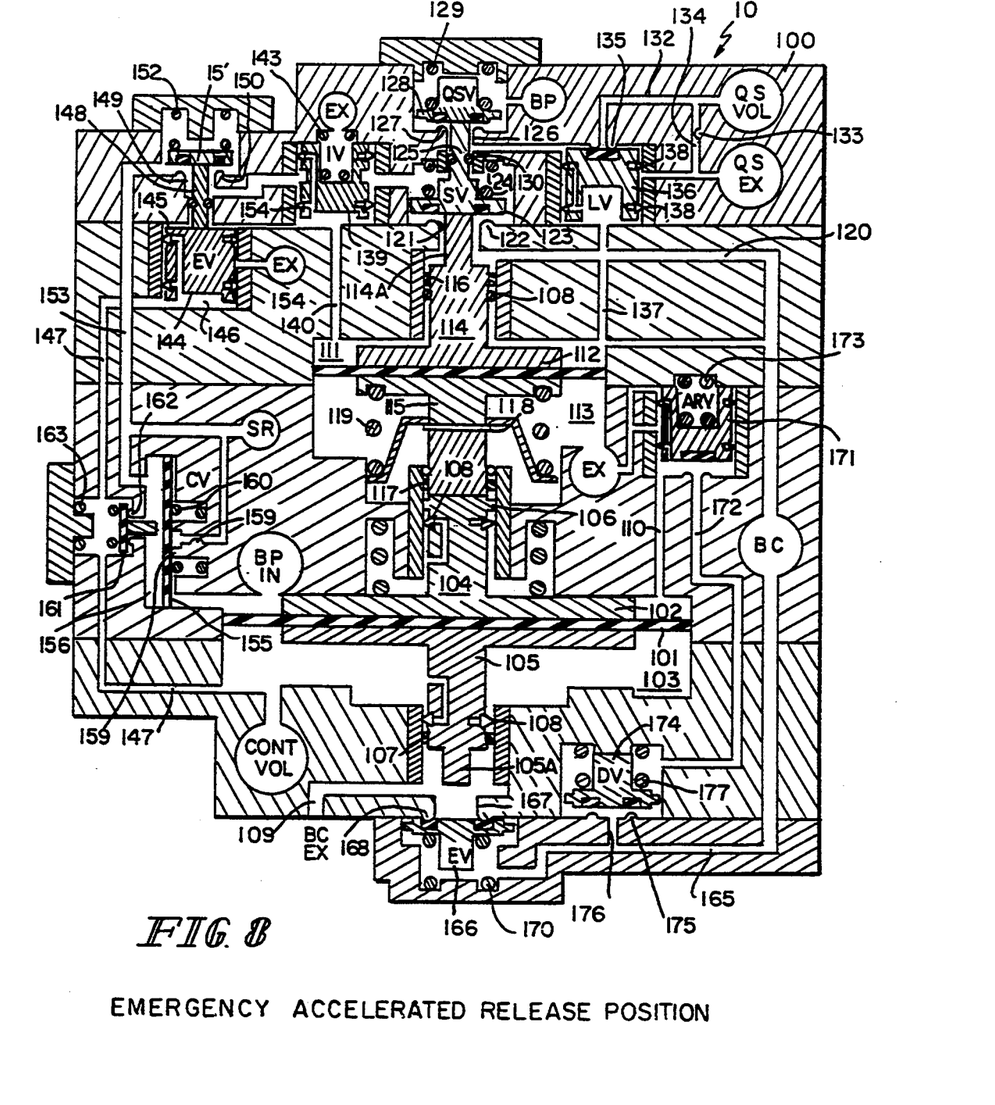
FIG. 8 is a cross-sectional view of the valve in FIG. 2 in its emergency accelerated release position.

As the brake pipe is recharged after an emergency application, the accelerator release valve 171 is open when the brake pipe pressure exceeds 10 PSI as illustrated in FIG. 8. This connects the brake cylinder to the brake pipe 1.5 through the open dissipation valve 174 and the accelerated release valve 171. This charges the brake pipe from the brake cylinder propagating the release signal or build-up through the system. The dissipation valve 174 will remain open until the brake pipe is nominally 10 PSI lower than the brake cylinder pressure. When the dissipation valve 174 is open, the emergency relay valve 151 will open attempting to maintain the pre-determined 85% ratio between the control volume and brake cylinder. This will drain down the supply reservoir until the supply reservoir and brake cylinder pressure are equal.

Once the brake pipe pressure is within 10 PSI of the brake cylinder pressure, the control and the relay piston stack 102, 112 will move down to the graduated relay position of FIG. 5, opening the brake cylinder exhaust valve 166 and closing the quick service valve 128 and supply valve 123. As the brake pipe pressure comes within a half of PSI of the reduced supply reservoir pressure, the charging valve 155 will open and the system will go into a direct release mode or a release ensuring. As noted previously, the emergency relay valve 151 has reduced the supply reservoir during the initial accelerated release condition. Thus the release ensuring will occur at the lowest possible brake pipe pressure after an emergency application. The limiting valve 136 is closed by the emergency brake application and remains closed until the brake pipe pressure during release is greater than brake cylinder pressure. The closed limiting valve 136 prevents the brake pipe charging after an emergency application from being diminished by filling the quick service volume and being exhausted through the continuous quick service choke 133.

MANUAL RELEASE VALVE

Figure 9:
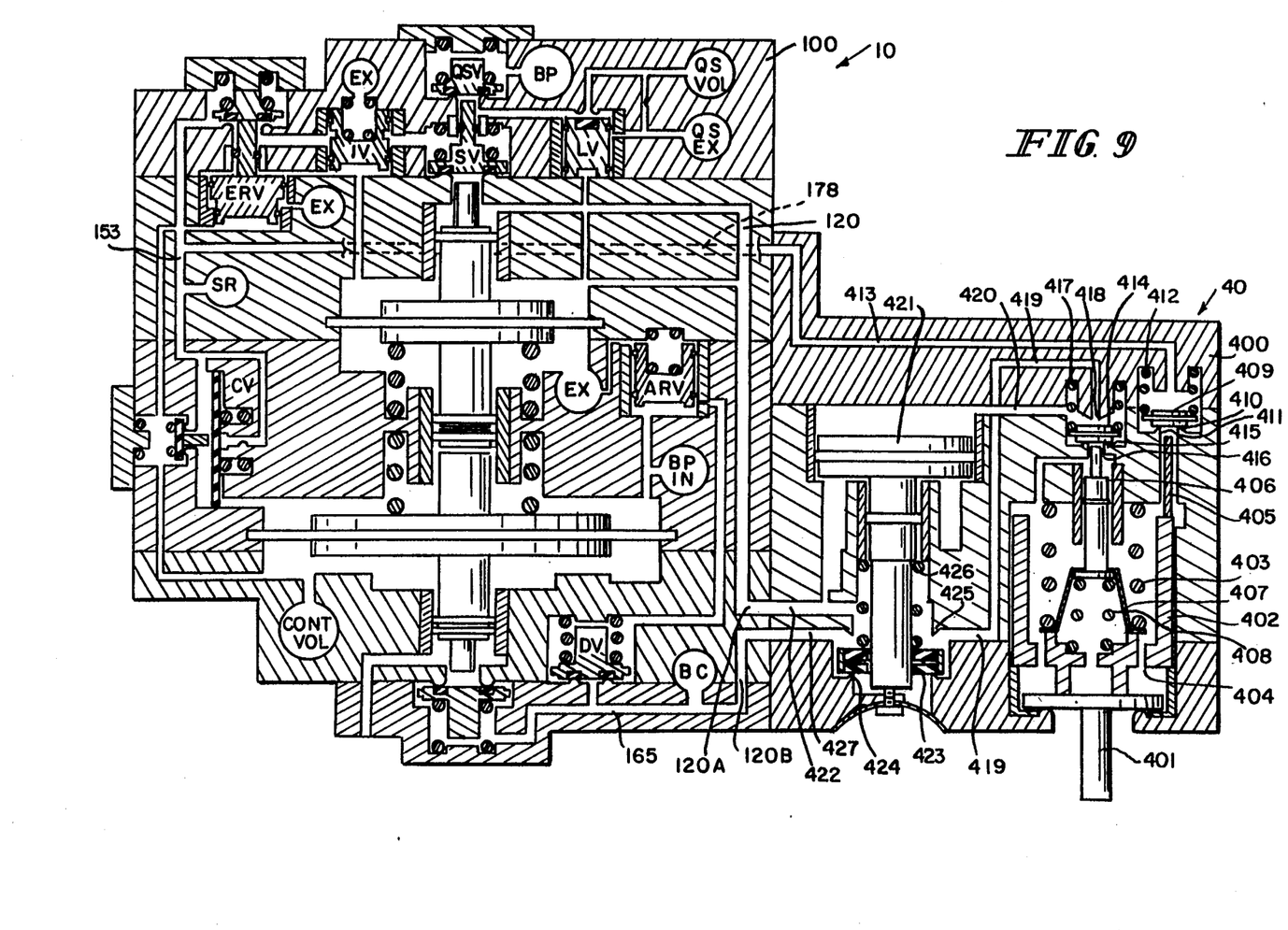
FIG.9 is a cross-sectional view of a release valve in combination with the control valve of FIG. 2 in its unactuated position according to the principles of the present invention.
Figure 10:
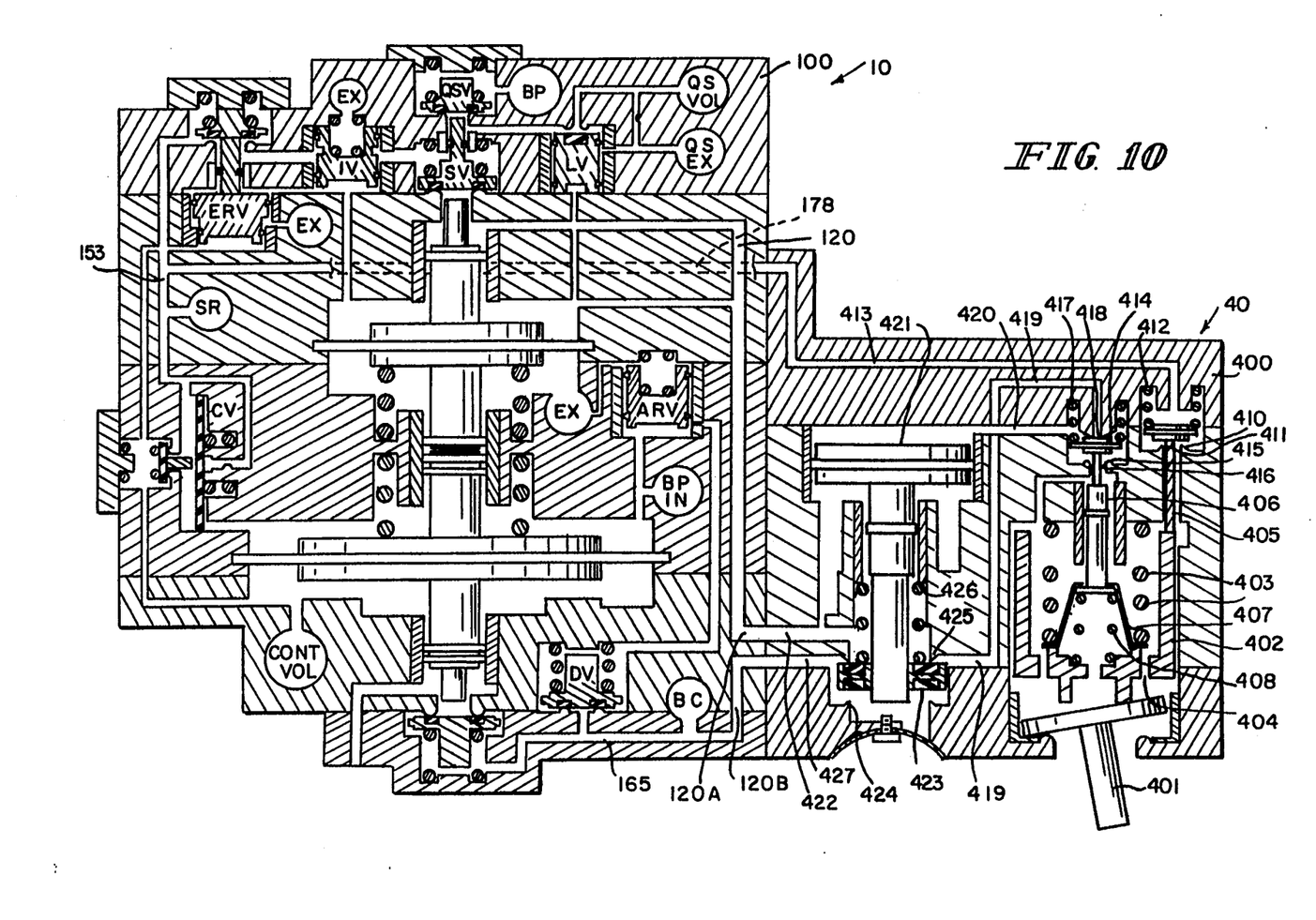
FIG. 10 is a cross-sectional view of the control valve and release valve of FIG. 9 during its actuated position.

Manual Release Valve 40 is illustrated in detail in FIGS. 9 and 10 connected directly to the control valve 10. The illustrated control valve 10 differs from that in FIGS. 2–8 in minor aspects which does not change the previously described operation. There is a schematic representation and the connection may be either directly or through the pipe bracket 30. The release valve 40 provides for the release of the brake cylinder and exhaust of the supply reservoir. An additional passage 178 is shown connecting passage 150 from the supply reservoir to the manual release valve 40 and passage 120 connecting the supply valve 123 to the brake cylinder is shown split in two as portions 120A and 120B at its connection to the manual release valve 40.

The manual release valve 40 includes a housing 400 having a release rod 401 extending therefrom. A cage 402 moves up and down in response the actuation of rod 401 against spring 403. Openings 404 in the cage 402 provides communication through the cage to the atmosphere. A supply reservoir operator 405 extends from the cage 402 as does brake cylinder operator 406. A cage 407 with spring 408 connects the brake cylinder operator 406 to the cage 402. A supply reservoir valve 409 has a valve seat 410 on the end of bore 411. The supply reservoir operator 405 opens the supply reservoir valve 409 against spring 412. Passage 413 connects the open supply reservoir valve 410 to passage 178 which is connected to passage 153 and the supply reservoir.

A brake cylinder valve 414 cooperates with the seat 415 on bore 416 which is connected to atmosphere. A spring 417 biases the valve 414 against seat 415 and against the operator 406. A second seat 418 on bore/passage 419 also cooperates with brake cylinder valve 414. Passage 420 connects the chamber between the seats 415 and 418 of the brake cylinder valve 414 to the chamber on top of piston 421. The chamber on the bottom of piston 421 is connected through passage 422 to passage 120A of the control valve 10 which is connected to the supply valve 123.

An exhaust valve 423 cooperates with exhaust seat 424 connected to atmosphere and a second seat 425 connected to passage 422. Spring 426 biases the valve 423 against the exhaust seat 424. Passage 427 connects the chamber in which the valve 423 operates to passage 126B of the control valve 10 and the brake cylinder.

In the unactuated position as illustrated in FIG. 10, supply reservoir valve 409 rests on valve seat 410 and disconnects the supply reservoir from atmosphere. Similarly, brake cylinder valve 414 rests on seat 415 cutting off passages 419 and 420 from atmosphere. Since valve seat 418 is open, the top and bottom of piston 421 are connected to each other and spring 426 biases exhaust valve 423 onto seat 424 disconnecting passages 419, 422 and 427 from atmosphere. This also interconnects passages 422 and 427 which interconnects the supply valve 123 to the brake cylinder via 120A and 120B.

When the rod 401 is manually actuated, cage 402 and operator 405 moves upward opening supply reservoir valve 409 thereby connecting passage 413 and the supply reservoir to exhaust. Operator 406 moves brake cylinder valve 414 off seat 415 and on to seat 418 as shown in FIG. 10. This connects passage 420 and the top of piston 421 to atmosphere and disconnects passage 419 from passage 420. Thus brake cylinder pressure below piston 421 forces the piston 421 up against spring 426. This moves valve 423 off seat 424 connecting the brake cylinder to atmosphere. Further upward movement causes valve 423 engage seat 425. The brake cylinder is continuously connected to atmosphere and passages 422 and 120A are disconnected from the brake cylinder passages 427 and 120B and atmosphere. This maintains any pressure from the open supply valve 123 onto the bottom of piston 421 which maintains the exhaust valve 423 open to continuously exhaust the brake cylinder. When rod 401 is released, valves 409 and 414 return to their position shown in FIG. 9. This will cut-off the venting of supply reservoir but not the venting of the brake cylinder since the piston 421 is locked in its upper position. Piston 421 will only return to its lower position if the manual release was held open long enough to reduce the supply reservoir pressure through open valve 109 below that of the force supplied by spring 426. Thus, the supply reservoir is exhausted as long as the release valve 40 is actuated and the brake cylinder is exhausted once the manually release valve 40 is actuated and until reset by spring 426.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A brake control valve system operating a vehicle's air brakes by controlling pressure in a brake cylinder from a reservoir in response to brake pipe pressure in a brake pipe, comprising:
    a quick braking volume;
    first piston means subject to brake pipe pressure on a first side;
    quick braking valve means for connecting brake pipe pressure to said quick braking volume when open;
    supply valve means for connecting the reservoir to the brake cylinder when open; and
    operator means for controlling said quick braking and supply valve means in response to the position of said first piston means so that said quick braking valve is open only when said supply valve is open.

2. A brake control valve system according to claim 1 wherein said operator means opens said supply valve means first and said quick braking valve means second and closes said quick braking valve means first and said supply valve means second.

3. A brake control valve system according to claim 1 wherein said quick braking and supply valve means are coaxial poppet valves.

4. A brake control valve system according to claim 3 wherein said operator means includes a first lost motion means between said first piston means and said supply valve means and a second lost motion means between said supply valve means and said quick braking valve means.

5. A brake control valve system according to claim 1 including a first choke means for continuously venting said quick braking volume to atmosphere.

6. A brake control valve system according to claim 5 including a limiting valve means for disconnecting an open quick braking valve means from said quick braking volume when brake cylinder pressure is greater than brake pipe pressure.

7. A brake control valve system according to claim 1 including a restriction means in series between the reservoir and the brake cylinder for varying a flow restriction inversely to brake cylinder pressure.

8. A brake control valve system operating a vehicle's air brakes by controlling pressure in a brake cylinder from a reservoir in response to brake pipe pressure in a brake pipe, comprising:
    first piston means subject to brake pipe pressure on a first side;

second piston means subject to brake cylinder pressure on one side thereof and operatively connected to said first piston means;

supply valve means for connecting the reservoir to the brake cylinder when open;

exhaust valve means for connecting the brake cylinder to atmosphere when open; and operator means for controlling said supply valve means and said exhaust valve means in response to the position of said first and second piston means to maintain a fixed ratio of brake cylinder pressure to brake pipe pressure reduction.

9. A brake control valve system according to claim 8 wherein said operator means includes a first lost motion means between said first piston means and said second piston means.

10. A brake control valve system according to claim 9 wherein said operator means includes a second lost motion means between said second piston means and said supply valve means and a third lost motion means between said exhaust valve means and said first piston means.

11. A brake control valve system according to claim 8 wherein said operator means opens said exhaust valve means for increases of brake pipe pressure and brake cylinder pressure to maintain said ratio.

12. A brake control valve system according to claim 8 wherein said operator means opens said supply valve means for decrease in brake pipe and brake cylinder pressure to maintain said ratio.

13. A brake control valve system according to claim 8 wherein said first and second piston means and said supply and exhaust valve means are coaxial.

14. A brake control valve system according to claim 8 including a quick braking valve means connecting said brake pipe to a quick braking volume when open and wherein said operator means opens said supply valve means without opening said quick braking valve means for small decreases in brake cylinder pressure.

15. A brake control valve system according to claim 8 including a control volume and wherein said first piston means is subject to control volume pressure on a second side opposite said first side.

16. A brake control valve system according to claim 15 including a control volume valve means for interconnecting said first and second sides of said first piston means when brake pipe pressure is within a second value of or greater than reservoir pressure.

17. A brake control valve system according to claim 16 wherein said control volume valve means interconnects said brake pipe and said reservoir when brake pipe pressure is within said second value of or greater than reservoir pressure.

18. A brake control valve system according to claim 15 including an emergency valve means for disconnecting said reservoir from said supply valve means when brake cylinder pressure is above a third value compared to said control volume pressure.

19. A brake control valve system according to claim 8 including a dissipation valve means for interconnecting said brake pipe and said brake cylinder when brake cylinder pressure is a fourth value greater than brake pipe pressure.

20. A brake control valve system according to claim 19 including an accelerated release valve means for disconnecting said brake pipe from said dissipation valve means when brake pipe pressure is below least a fifth value.

21. A brake control valve system according to claim 20 wherein said operator means opens said exhaust valve means at least for increases of brake pipe pressure when both said dissipation valve means is closed and said accelerated release valve means is open.

22. A brake control valve system operating a vehicle's air brakes by controlling pressure in a brake cylinder from a reservoir in response to brake pipe pressure in a brake pipe, comprising:

a control volume;

first piston means subject to brake pipe pressure on a first side and control volume pressure on a second side;

supply valve means for connecting the reservoir to the brake cylinder when open;

exhaust valve means for connecting the brake cylinder to atmosphere when open;

operator means responsive to the position of said first piston means for opening said supply valve means for decreases of brake pipe pressure to apply said brakes and for opening said exhaust valve means for increases of brake pipe pressure to release said brakes; and release mode means for controlling the position of said first piston means to open and close said exhaust valve means to gradually release said brakes for an initial range of increase of brake pipe pressure and to open said exhaust valve means to fully release said brakes for a final range of increases of brake pipe pressure.

23. A brake control valve system according to claim 22 wherein said release mode means includes a control volume valve means for interconnecting said first and second sides of said first piston means when brake pipe pressure is within said final range.

24. A brake control valve system according to claim 23 wherein said control volume valve means interconnects said first and second sides of said first piston means when brake pipe pressure is within a first value of or greater than reservoir pressure to fully release said brakes.

25. A brake control valve system according to claim 22 wherein said release mode means includes a charging valve means for connecting at least one of said reservoir and said control volume to said brake pipe when brake pipe pressure is within said final range to increase brake pipe pressure.

26. A brake control valve system according to claim 22 including accelerated release valve means for connecting said brake cylinder to said brake pipe when brake pipe pressure is above a minimum level and less than brake cylinder pressure to increase brake pipe pressure.

27. A brake control valve system according to claim 26 wherein said release mode means is inoperative while said accelerated release valve means is operative.

28. A brake control valve system operating a vehicle's air brakes by controlling pressure in a brake cylinder from a reservoir in response to brake pipe pressure in a brake pipe, comprising:

first piston means subject to brake pipe pressure on a first side;

supply valve means for connecting the reservoir to the brake cylinder when open;

exhaust valve means for connecting the brake cylinder to atmosphere when open;

operator means responsive to the position of said first piston means for opening said supply valve means for decreases of brake pipe pressure to apply said brakes and for opening said exhaust valve means for increases of brake pipe pressure to release said brakes; and dissipation valve means for interconnecting said brake pipe and said brake cylinder when brake cylinder pressure is a first value greater than brake pipe pressure.

29. A brake control valve system according to claim 28 including an accelerated release valve means for disconnecting said brake pipe from said dissipation valve means when brake pipe pressure is below a second value.

30. A brake control valve system according to claim 29 wherein said operator means opens said exhaust valve means for increases of brake pipe pressure when both said dissipation valve means is closed and said accelerated release valve means is open.

31. A brake control valve system according to claim 28 wherein said first piston means is subject to control volume pressure on a second side and including a control volume valve means for interconnecting said brake pipe and said control volume when brake pipe pressure is within a third value of or greater than reservoir pressure.

32. A brake control valve system according to claim 31 wherein said control volume valve means interconnects said brake pipe and said reservoir when said brake pipe pressure is within said third value of or greater than reservoir pressure.

33. A brake control valve system operating a vehicle's air brakes by controlling pressure in a brake cylinder from a reservoir in response to brake pipe pressure in a brake pipe, comprising:

a pipe bracket connected to the brake cylinder, reservoir and brake pipe, a control volume and quick braking volume in said pipe bracket;

control valve housing mounted to said pipe bracket;

first piston means in said control valve housing and subject to brake pipe pressure on a first side and control volume pressure on a second side;

quick braking valve means in said control valve housing for connecting brake pipe pressure to said quick braking volume when open;

supply valve means in said control valve housing for connecting the reservoir to the brake cylinder when open;

exhaust valve means in said control valve housing for connecting the brake cylinder to atmosphere when open; and operator means in said control valve housing responsive to the position of said first piston means for opening said quick braking and supply valve means for service and emergency decreases of brake pipe pressure to apply said brakes and for opening said exhaust valve means for increases of brake pipe pressure to release said brakes.

34. A brake control valve system according to claim 33 including an emergency venting valve means mounted to said pipe bracket and responsive to an emergency rate of decreases of brake pipe pressure for venting brake pipe to atmosphere to initiate and propagate emergency braking.

35. A brake control valve system according to claim 33 including a release valve means mounted to said control valve housing for venting both said brake cylinder and said reservoir when manually actuated.

* * * * *